US011672009B2

(12) United States Patent
Turtinen et al.

(10) Patent No.: US 11,672,009 B2
(45) Date of Patent: Jun. 6, 2023

(54) PERFORMING OVERLOAD CONTROL FOR RANDOM ACCESS CHANNEL

(71) Applicant: Nokia Technologies Oy, Espoo (FI)

(72) Inventors: Samuli Turtinen, Ii (FI); Chunli Wu, Beijing (CN); Timo Koskela, Oulu (FI); Benoist Sebire, Tokyo (JP); Esa Malkamäki, Espoo (FI); Yanji Zhang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/055,369

(22) PCT Filed: Jul. 2, 2018

(86) PCT No.: PCT/CN2018/094139
§ 371 (c)(1),
(2) Date: Nov. 13, 2020

(87) PCT Pub. No.: WO2020/006670
PCT Pub. Date: Jan. 9, 2020

(65) Prior Publication Data
US 2021/0227582 A1    Jul. 22, 2021

(51) Int. Cl.
*H04W 74/08*    (2009.01)
*H04W 74/00*    (2009.01)
(Continued)

(52) U.S. Cl.
CPC ..... *H04W 74/0816* (2013.01); *H04W 56/001* (2013.01); *H04W 72/046* (2013.01); *H04W 74/008* (2013.01)

(58) Field of Classification Search
CPC .............. H04B 7/0665; H04W 56/001; H04W 72/046; H04W 74/008; H04W 74/0816; H04W 74/0833
See application file for complete search history.

(56) References Cited

U.S. PATENT DOCUMENTS

2011/0317777 A1   12/2011   Huang et al.
2015/0282214 A1   10/2015   Lee et al.
(Continued)

FOREIGN PATENT DOCUMENTS

CN    106664700 A    5/2017
EP     2566277 A2    3/2013
(Continued)

OTHER PUBLICATIONS

"Beam Reselection in case of High Load during RA", 3GPP TSG-RAN WG2 #101Bis, Tdoc R2-1805413, Agenda: 10.3.1.4.2, Ericsson, Apr. 16-20, 2018, 2 pages.
(Continued)

*Primary Examiner* — Liton Miah
(74) *Attorney, Agent, or Firm* — Harrington & Smith

(57) ABSTRACT

In accordance with some embodiments, an apparatus may include at least one processor and at least one memory including computer program code. The at least one memory and the computer program code can be configured to, with the at least one processor, cause the apparatus to at least receive at least one random access preamble from user equipment. The at least one memory and the computer program code can be further configured to, configure at least one backoff indicator. The at least one memory and the computer program code can be further configured to, with the at least one processor, cause the apparatus to at least transmit the at least one backoff indicator and at least one backoff configuration indicator to the user equipment. The at least one backoff configuration indicator is used to indicate how the at least one backoff indicator is applied.

20 Claims, 5 Drawing Sheets

(51) Int. Cl.
  *H04W 72/04* (2023.01)
  *H04W 56/00* (2009.01)
  *H04W 72/044* (2023.01)

(56) References Cited

U.S. PATENT DOCUMENTS

| | | | |
|---|---|---|---|
| 2017/0351873 A1 | 12/2017 | Luff et al. | |
| 2020/0052767 A1* | 2/2020 | Wang | H04W 74/0833 |
| 2021/0195676 A1* | 6/2021 | Wang | H04W 74/002 |

FOREIGN PATENT DOCUMENTS

| | | | | |
|---|---|---|---|---|
| WO | WO-2014/065592 A1 | | 5/2014 | |
| WO | WO-2014/065593 A1 | | 5/2014 | |
| WO | 2017/161479 A1 | | 9/2017 | |
| WO | 2017/178697 A1 | | 10/2017 | |
| WO | WO-2019064270 A1 | * | 4/2019 | H04W 72/046 |
| WO | WO-2019145876 A1 | * | 8/2019 | H04W 74/006 |

OTHER PUBLICATIONS

"Beam Reselection in case of High Load during RA", 3GPP TSG-RAN WG2 Meeting #101bis, R2-1805422, Ericsson, Apr. 16-20, 2018, 4 pages.

"Backoff Value Setting on SS Block Change", 3GPP TSG-RAN WG2 #101bis, R2-1805153, Agenda : 10.3.1 4.2, Google, Apr. 16-20, 2018, pp. 1-7.

"Beam Reselection in RACH Procedure", 3GPP TSG-RAN WG2 Meeting#101bis, R2-1805781, Agenda : 10.3.1.4.2, Huawei, Apr. 16-20, 2018, 3 pages.

"Backoff Indication in Multi-beam Operation", 3GPP TSG-RAN WG2 Meeting #101bis, R2-1805751, Agenda : 10.3.1.4.2, Qualcomm Incorporated, Apr. 16-20, 2018, pp. 1-5.

"On the RA Back-off Indication in Multibeam System", 3GPP TSG-RAN WG2 Meeting #102, R2-1808027, Agenda : 10.3.1.4.2, Nokia, May 21-25, 2018, 2 pages.

"3rd Generation Partnership Project; Technical Specification Group Radio Access Network; NR; Physical layer procedures for control (Release 15)", 3GPP TS 38.213, V15.1.0, Mar. 2018, pp. 1-77.

"3rd Generation Partnership Project; Technical Specification Group Radio Access Network; NR; Medium Access Control (MAC) protocol specification (Release 15)", 3GPP TS 38.321, V15.1.0, Mar. 2018, pp. 1-67.

International Search Report and Written Opinion received for corresponding Patent Cooperation Treaty Application No. PCT/CN2018/094139, dated Feb. 27, 2019, 10 pages.

Huawei et al. "RACH Backoff" 3GPP Draft; R2-1706460 RACH Backoff, $3^{rd}$ Generation Partnership Project (3GPP), Mobile Competence Centre; 650, Route Des Lucioles; F-06921 Sophia-Antipolis Cdex; France. Jun. 26, 2017.

* cited by examiner

PERFORMING OVERLOAD CONTROL FOR RANDOM ACCESS CHANNEL

RELATED APPLICATION

This application was originally filed as PCT Application No. PCT/CN2018/094139, filed on 2 Jul. 2018.

BACKGROUND

Field

Certain embodiments may relate to communication systems. For example, some embodiments may relate to random access procedures associated with backoff timers.

Description of the Related Art

Backoff techniques may be applied to beam and synchronization signal block (SSB) combinations, where a backoff timer is used for specific SSBs when a random access response (RAR) containing a backoff indicator (BI) is received. In addition, scaling factors may be utilized in new radio (NR) technology, where user equipment configured with an adjustment factor may receive priority over other user equipment by adjusting a backoff timer to a value lower than indicated by the BI. The use of backoff timers may be beneficial for improving the performance of overloaded beams.

However, current techniques fail to address challenges where a majority of the beams in a cell or group experience high congestion, such as a wireless hotspot. For example, the inclusion of multiple backoff values and indices of sets of synchronization signal blocks experiencing congestion significantly increases the content overhead of a RAR, which should preferably be kept as small as possible to avoid reduction in coverage. In addition, it is desirable to include backoff indicators without modifying the format of RAR PDUs in a non-backwards compatible manner.

SUMMARY

In accordance with some embodiments, a method may include receiving, by a network entity, at least one random access preamble from user equipment. The method may further include configuring, by the network entity, at least one backoff indicator. The method may further include transmitting, by the network entity, the at least one backoff indicator to the user equipment. The at least one backoff configuration indicator is used to indicate how the at least one backoff indicator is applied.

In accordance with some embodiments, an apparatus may include means for receiving at least one random access preamble from user equipment. The apparatus may further include means for configuring at least one backoff indicator. The apparatus may further include means for transmitting the at least one backoff indicator to the user equipment. The at least one backoff configuration indicator is used to indicate how the at least one backoff indicator is applied.

In accordance with some embodiments, an apparatus may include at least one processor and at least one memory including computer program code. The at least one memory and the computer program code can be configured to, with the at least one processor, cause the apparatus to at least receive at least one random access preamble from user equipment. The at least one memory and the computer program code can be further configured to, with the at least one processor, cause the apparatus to at least configure at least one backoff indicator. The at least one memory and the computer program code can be further configured to, with the at least one processor, cause the apparatus to at least transmit the at least one backoff indicator to the user equipment. The at least one backoff configuration indicator is used to indicate how the at least one backoff indicator is applied.

In accordance with some embodiments, a non-transitory computer readable medium can be encoded with instructions that may, when executed in hardware, perform a method. The method may receive at least one random access preamble from user equipment. The method may further configure at least one backoff indicator. The method may further transmit the at least one backoff indicator to the user equipment. The at least one backoff configuration indicator is used to indicate how the at least one backoff indicator is applied.

In accordance with some embodiments, a computer program product may perform a method. The method may receive at least one random access preamble from user equipment. The method may further configure at least one backoff indicator. The method may further transmit the at least one backoff indicator to the user equipment. The at least one backoff configuration indicator is used to indicate how the at least one backoff indicator is applied.

In accordance with some embodiments, an apparatus may include circuitry configured to receive at least one random access preamble from user equipment. The circuitry may further configure at least one backoff indicator. The circuitry may further transmit the at least one backoff indicator to the user equipment. The at least one backoff configuration indicator is used to indicate how the at least one backoff indicator is applied.

In accordance with some embodiments, a method may include transmitting, by user equipment, at least one random access channel preamble associated with at least one beam to network entity. The method may further include receiving, by the user equipment, at least one backoff indicator and at least one backoff configuration indicator. The method may further include determining, by the user equipment, applicability of the at least one backoff indicator based on the at least one backoff configuration indicator.

In accordance with some embodiments, an apparatus may include means for transmitting at least one random access channel preamble associated with at least one beam to network entity. The apparatus may further include means for receiving at least one backoff indicator and at least one backoff configuration indicator. The apparatus may further include means for determining applicability of the at least one backoff indicator based on the at least one backoff configuration indicator.

In accordance with some embodiments, an apparatus may include at least one processor and at least one memory including computer program code. The at least one memory and the computer program code can be configured to, with the at least one processor, cause the apparatus to at least transmit at least one random access channel preamble associated with at least one beam to network entity. The at least one memory and the computer program code can be further configured to, with the at least one processor, cause the apparatus to at least receive at least one backoff indicator and at least one backoff configuration indicator. The at least one memory and the computer program code can be further configured to, with the at least one processor, cause the apparatus to at least determine applicability of the at least one backoff indicator based on the at least one backoff configuration indicator.

In accordance with some embodiments, a non-transitory computer readable medium can be encoded with instructions that may, when executed in hardware, perform a method. The method may transmit at least one random access channel preamble associated with at least one beam to network entity. The method may further receive at least one backoff indicator and at least one backoff configuration indicator. The method may further determine applicability of the at least one backoff indicator based on the at least one backoff configuration indicator.

In accordance with some embodiments, a computer program product may have instructions encoded for performing a method. The method may transmit at least one random access channel preamble associated with at least one beam to network entity. The method may further receive at least one backoff indicator and at least one backoff configuration indicator. The method may further determine applicability of the at least one backoff indicator based on the at least one backoff configuration indicator.

In accordance with some embodiments, an apparatus may include circuitry configured to transmit at least one random access channel preamble associated with at least one beam to network entity. The circuitry may further receive at least one backoff indicator and at least one backoff configuration indicator. The circuitry may further determine applicability of the at least one backoff indicator based on the at least one backoff configuration indicator.

BRIEF DESCRIPTION OF THE DRAWINGS

For proper understanding of this disclosure, reference should be made to the accompanying drawings, wherein.

DETAILED DESCRIPTION

Certain embodiments described herein may help to manage overloads of random access procedures. The example embodiments described herein may have various benefits and/or advantages. For example, some embodiments may prevent user equipment from needing to perform backoff procedures for only individual beams. In addition, certain embodiments may manage loads for beams experiencing high load conditions by applying a group-based backoff timer and/or a backoff timer unrelated to a beam utilized by the user equipment for transmitting random access preambles. Certain embodiments may also provide a simplified system information block (SIB) option that does not require changes to a backoff indicator field in a MAC PDU subheader for RAR by using an R bit for the backoff indicator. Furthermore, some embodiments may indicate how to apply the backoff procedure in a backoff indicator subheader in the MAC PDU for RAR, for instance, by using an R bit, providing an additional benefit by allowing selective specification of beam groups. These embodiments may allow the network to limit any beam-specific backoff procedures for user equipment accessing selected beams, such as in a hotspot scenario where groups of beams in close proximity experience congestion. Certain embodiments are, therefore, directed to improvements in computer-related technology, specifically, by conserving network resources and reducing power consumption of network entities and/or user equipment located within the network.

Figure 1:
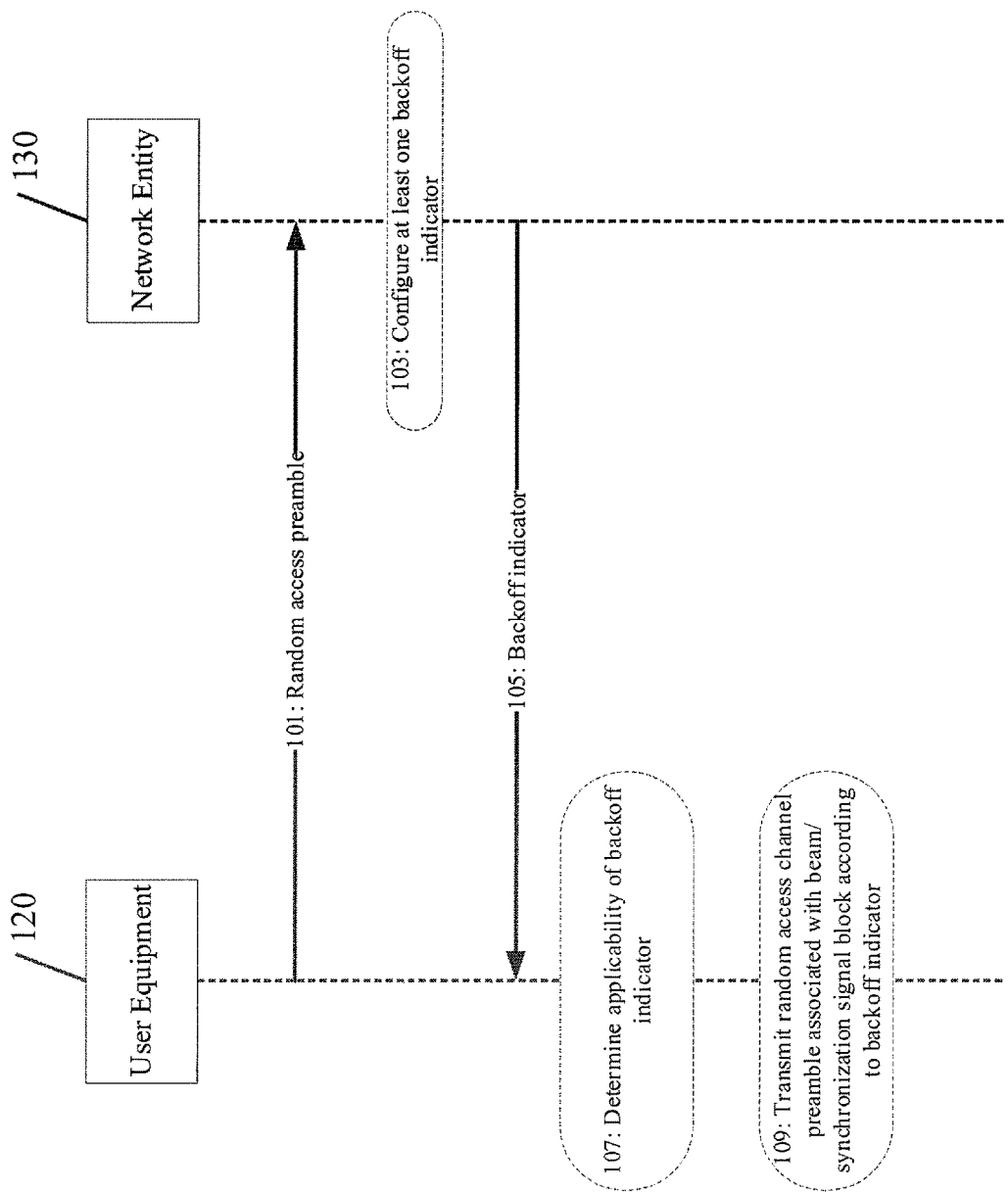
FIG. 1 illustrates an example of a signaling diagram according to certain embodiments.
Figure 5:
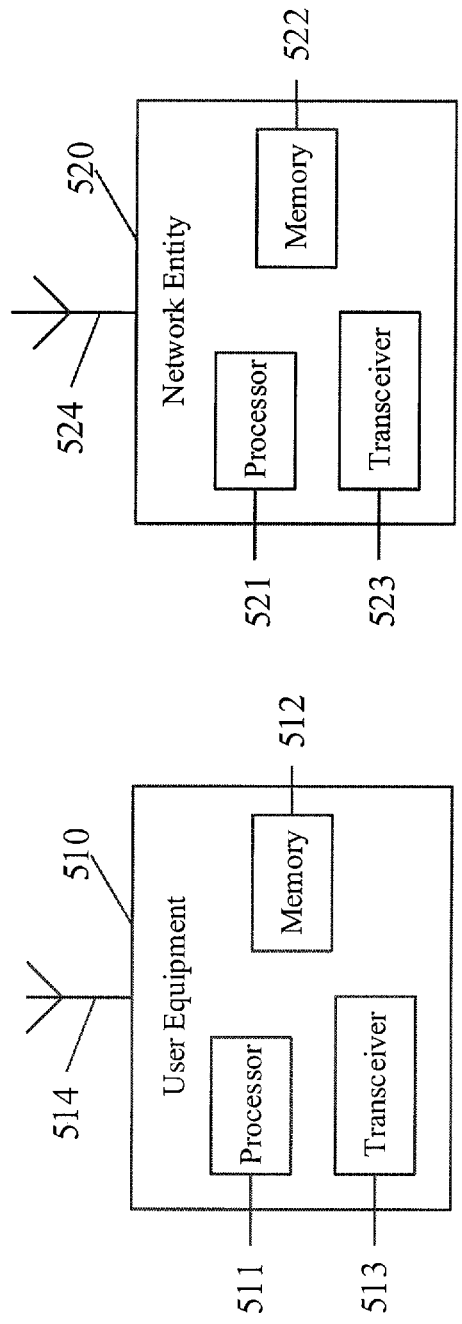
FIG. 5 illustrates an example of a system according to certain embodiments.

FIG. 1 illustrates an example of a signaling diagram showing communications between user equipment (UE) 120 and network entity (NE) 130. UE 120 may be similar to UE 510, as illustrated in FIG. 5. Likewise, NE 130 may be similar to NE 520, also illustrated in FIG. 5.

In step 101, UE 120 may transmit at least one random access preamble to NE 130. In certain embodiments, the at least one random access preamble may be transmitted using one or more beams.

In step 103, NE 130 may configure at least one backoff indicator (BI). Each BI may be associated with a backoff time value, such as a number of milliseconds. In some embodiments, one or more, or each, of the one or more backoff indicators comprise an indication of at least one backoff configuration.

In step 105, the at least one BI are transmitted to UE 120. In some embodiments, the one or more backoff indicators are transmitted as part of at least one medium access control protocol data unit subheader for random access response. In other embodiments, the one or more backoff indicators are transmitted as part of at least one system information broadcast for initial access. In certain embodiments, the one or more backoff indicators are transmitted as part of at least one dedicated radio resource control signaling for radio access associated with mobility events. Alternatively or additionally, at least one group of one or more beams and/or SSBs may be explicitly configured by NE 130 and/or a network operator based upon system information.

NE 130 may include, with the at least one BI, the configuration of the at least one BI described above, specifically, applying the BI irrespective of the beams which transmitted the at least one random access preamble in step 101, applying the BI to all or some beams of UE 120, and/or applying the BI to a group of one or more beams and/or SSBs of UE 120. In some embodiments, NE 130 may indicate each of these options as a one-bit indicator. As an example, applying the BI to one or more beams of UE 120, such as a group of one or more beams and/or SSBs of UE 120 which transmitted the at least one random access preamble in step 101, may be associated with a first indicator, such as "0," while applying the BI to all beams irrespective of the beams which transmitted the at least one random access preamble in step 101 may be associated with a second indicator, such as "1." In embodiments where the at least one group of one or more beams and/or SSBs of UE 120 were implicitly determined based upon a mapping of SSBs per RO, UE 120 may implicitly assume that the at least one BI applies either to a predetermined group of beams/SSBs or applies to all beams of UE 120 irrespective of the beams that transmitted the at least one random access preamble in step 101.

Figure 2:
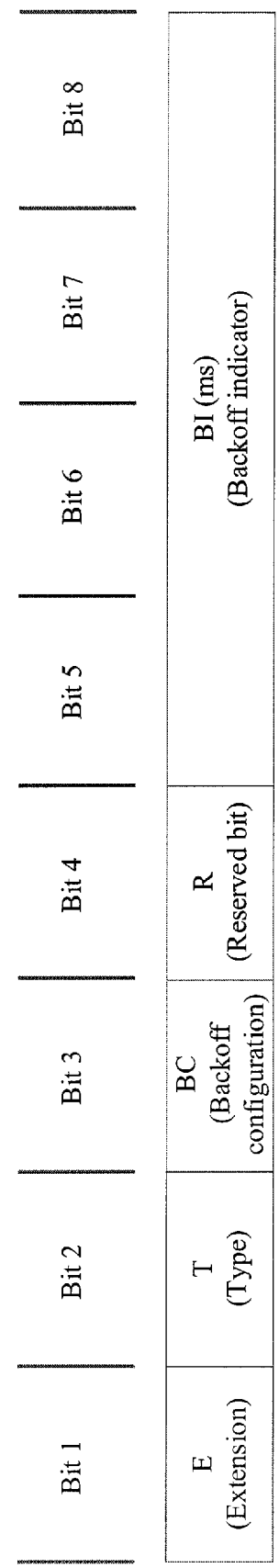
FIG. 2 illustrates an example of a medium access control (MAC) layer protocol data unit (PDU) for a random access response (RAR) according to certain embodiments.

In some embodiments, NE 130 may include the at least one BC in a MAC PDU for RAR, for example, the at least one BC may be included in one of the R bits of the BI MAC subheader, such as the MAC subheader that is illustrated in FIG. 2. In other embodiments, NE 130 may include the at least one BI as part of a system information block (SIB), such as SIB1, for initial access. In certain embodiments, NE

130 may transmit the at least one BI as part of dedicated radio resource control (RRC) signaling for radio access during mobility events, such as handover, configuration, calibration, and/or measurement reporting procedures.

In step 107, UE 120 may determine the applicability of the at least one BI. In some embodiments, the applicability of at least one BI may be associated with a group of one or more beams and/or at least one synchronization signal block (SSB) and/or at least one channel state information reference signal (CSI-RS). For example, a group of one or more beams may include one or more beams that are associated with the transmitted at least one random access preamble in step 101.

In various embodiments, at least one group of one or more beams and/or SSBs may be implicitly determined based on a mapping of SSBs per random access channel occasion (RO). In this example, one or more SSBs sharing the same RO as the SSB where the preamble transmitted by the UE 120 is associated may be included in one or more groups of beams/SSBs which may be designated to have backoff procedure applied. In some embodiments, this may be related to the timing required and/or expected to transmit a random access response (RAR) from NE 130 equaling, or being within a predetermined threshold of, the timing to send RAR for the one or more SSBs sharing the same RO.

In some embodiments, UE 120 may determine that at least one BI applies irrespective of the beams towards which the at least one random access preamble in step 101 was transmitted and/or applies to all or some beams of the cell from which the UE 120 is served. In other embodiments, UE 120 may determine that at least one BI applies to a group of one or more beams and/or SSBs, such as those discussed above. In certain embodiments, UE 120 may determine that at least one BI applies to a specific beam/SSB, such as a beam for which UE 120 performs and/or has been performing random access (RA) procedures.

In some embodiments, NE 130 may determination additional configuration if UE 120 without beam correspondence are allowed to apply the BI beam specifically or whether it shall apply always the BI as cell specific.

In step 109, UE 120 may transmit one or more RACH preambles associated with the beam/SSB which transmitted the random access preamble in step 101 according to the backoff indicator. In certain embodiments, the transmitting may include prohibiting transmission of RACH preambles associated with the beam/SSB which transmitted the random access preamble for a predefined period of time, such as when the backoff timer expires, until an event occurs, or indefinitely.

In some embodiments, the transmitting may include UE 120 applying one or more backoff scaling factors to the at least one received BI. Each backoff scaling factor may be associated with a numeric value. In some embodiments, the one or more backoff scaling factors may be related to the applicability of the BI. For example, one or more backoff scaling factors may be utilized for a BI applied irrespective of the beams which transmitted the at least one random access preamble in step 101. Furthermore, one or more backoff scaling factors may be utilized for a BI applied to all or some beams of UE 120. Finally, one or more backoff scaling factors may be utilized for a BI associated with a group of one or more beams and/or SSBs of UE 120. Where the BI indicates that the BI applies regardless of the beams used by the user equipment, the BI may still be applicable even if the user equipment selects another beam for further transmission attempts; thus, UE 120 may not reuse any beam before the backoff timer has expired. As a result, subsequent random access preamble transmissions may be delayed during the backoff timer. Alternatively, where the BI indicates that the BI applies only at least one specific beam or to at least group of at one or more beams, the BI may only be applied to at least one current beam, and UE 120 may immediately attempt to reuse another beam if available. As a result, the SSB corresponding with the transmitted random access preamble, as well as each SSB associated with the same physical random access channel (PRACH) occurrence, may have a delayed operation during the backoff timer.

Some embodiments may provide additional functionality when at least one BI is received from NE 130 in step 105. For example, where the BI applies to all or some beams of UE 120 and/or a group of one or more beams and/or SSBs of UE 120, if RACH preambles are mapped to at least one channel state information reference signal (CSI-RS) which do not correspond with at least one SSB beam, the network may transmit at least one RAR using at least one downlink beam in at least one direction simultaneously. In certain embodiments, NE 130 may select a subset of downlink beams of UE 120 to transmit RAR with at least one BI, and UE 120 may determine whether at least one received BI is beam or cell specific, according to the signaled indication.

FIG. 2 illustrates an example of a medium access control (MAC) layer protocol data unit (PDU) for random access response (RAR). Specifically, FIG. 2 illustrates a new indication in the MAC PDU for RAR. The extension field in bit 1 may be a flag indicating whether the MAC PDU subheader is the last MAC PDU subheader in the MAC PDU. For example, a value of "1" may indicate at least one MAC PDU subheader associated with the same MAC PDU may follow, while a value of "0" may indicate that the MAC PDU subheader is the last MAC PDU subheader of the MAC PDU. The type field in bit 2 may be a flag indicating whether the MAC subheader contains at least one random access preamble identifier (RAPID) and/or a backoff indicator. For example, a value of "0" may indicate the presence of a backoff indicator field in the MAC PDU subheader, while a value of "1" may indicate the presence of a RAPID in the MAC PDU subheader.

In addition to the extension and type fields, a new backoff configuration (BC) indicator may be added to the MAC subheader, such as in in bit 3, along with a backoff indicator (BI), such as in bits 5-8, indicating whether the BI applies regardless of the beams used by the user equipment, applies only at least one specific beam, or applies to at least group of at one or more beams. At least one of these beams may be associated with the beam used by the user equipment performing the random access procedure. Where the BI indicates that the BI applies regardless of the beams used by the user equipment, the BI may still be applicable even if the user equipment selects another beam for further attempts; thus, the user equipment may not reuse any beam before the backoff expires. As a result, subsequent random access preamble transmissions may be delayed during the backoff timer. Alternatively, where the BI indicates that the BI applies only at least one specific beam or to at least group of at one or more beams, the BI may only be applied to at least one current beam and/or the beams sharing the same RO as current beam, and the user equipment may immediately attempt to reuse another beam, if available. As a result, the SSB corresponding with the transmitted random access preamble, as well as for each SSB associated with the same physical random access channel (PRACH) occurrence, may be delayed during the backoff timer. In some embodiments, the BI for a specific beam may apply after at least one particular beam is reused by the user equipment to another beam; thus, the backoff would need to expire before the user equipment reuses a beam after receiving the BI.

Figure 3:
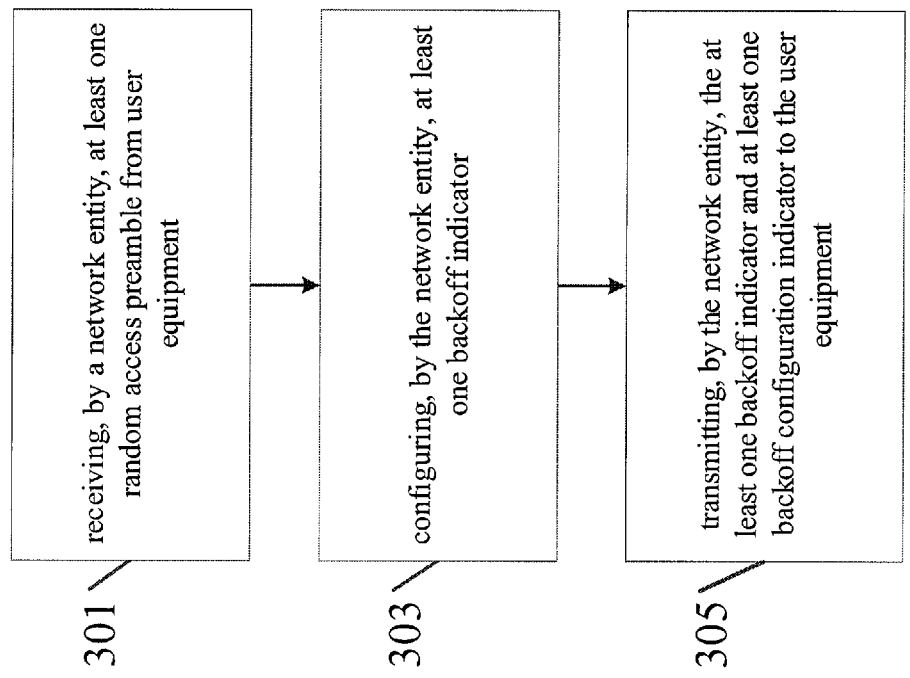
FIG. 3 illustrates an example of a method performed by a network entity according to certain embodiments.

FIG. 3 illustrates an example method performed by a network entity, similar to network entity 520 that is illustrated in FIG. 5. In step 301, the network entity may receive at least one random access preamble from user equipment, which may be similar to user equipment 510 in FIG. 5. In certain embodiments, the at least one random access preamble may be received from user equipment.

In step 303, the network entity may configure at least one backoff indicator (BI). Each BI may be associated with a backoff time value, such as a number of milliseconds. In some embodiments, one or more, or each, of the one or more backoff indicators comprise an indication of at least one backoff configuration.

In step 305, the network entity may transmit at least one BI and/or BCI and at least one backoff configuration indicator (BCI) to the user equipment, for example, at least one BI configured in step 303. In some embodiments, the network entity may include the at least one BI and/or BCI in a MAC PDU for RAR, for example, the at least one BI and/or BCI may be included in one of the R bits of the BI MAC subheader, such as illustrated in FIG. 2. In other embodiments, the network entity may include the at least one BI as part of a system information block (SIB), such as SIB1, for initial access. In certain embodiments, the network entity may transmit the at least one BI and/or BCI as part of dedicated radio resource control (RRC) signaling for radio access during mobility events, such as handover, configuration, calibration, and/or measurement reporting procedures. The at least one backoff configuration indicator is used to indicate how the at least one backoff indicator is applied.

Figure 4:
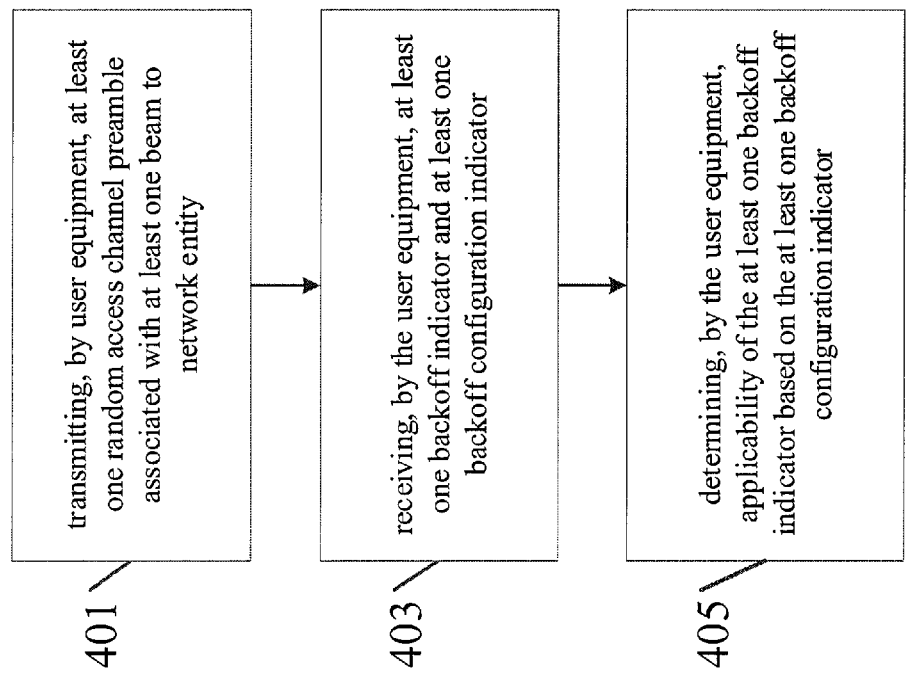
FIG. 4 illustrates an example of a method performed by user equipment according to certain embodiments.

FIG. 4 illustrates an example method performed by user equipment, similar to user equipment 510 that is illustrated in FIG. 5. In step 401, the user equipment may transmit at least one random access channel preamble associated with at least one beam/synchronization signal block to a network entity. In step 403, the user equipment may receive at least one BI and at least one BIC from the network entity. In some embodiments, the at least one BI and/or BIC may be included in a MAC PDU for RAR, for example, the at least one BI and/or BIC may be included in one of the R bits of the BI MAC subheader, such as illustrated in FIG. 2. In other embodiments, the at least one BI and/or BIC may be included as part of a system information block (SIB), such as SIB 1, for initial access. In certain embodiments, the user equipment may receive the at least one BI as part of dedicated radio resource control (RRC) signaling for radio access during mobility events, such as handover, configuration, calibration, and/or measurement reporting procedures.

The user equipment may receive, with the at least one BI, the configuration of the at least one BI, which may indicate, at least, applying the BI irrespective of the beams which transmitted the at least one random access preamble, applying the BI to all or some beams of the user equipment, and/or a group of one or more beams and/or SSBs of the user equipment. In some embodiments, the user equipment may receive an indication of each of these options as a one-bit indicator. As an example, applying the BI to one or more beams of the user equipment, such as a group of one or more beams and/or SSBs of the user equipment which transmitted the at least one random access preamble in step 101, may be associated with a first indicator, such as "0," while applying the BI to all beams irrespective of the beams which transmitted the at least one random access preamble in step 101 may be associated with a second indicator, such as "1." In embodiments where the at least one group of one or more beams and/or SSBs of the user equipment were implicitly determined based upon a mapping of SSBs per RO, the user equipment may implicitly assume that the at least one BI applies either to a predetermined group of beams/SSBs or applies to all beams of the user equipment irrespective of the beams that transmitted the at least one random access preamble.

In some embodiments, the user equipment may configure if the network entity without beam correspondence are allowed to apply the BI beam specifically or whether it shall apply always the BI as cell specific.

In step 405, the user equipment may determine the applicability of at least one BI based on the at least one BCI. In step 407, the user equipment may transmit at least one RACH preambles associated with the beam/SSB which transmitted the random access preamble. In certain embodiments, the modification may include prohibiting transmission of RACH preambles associated with the beam/SSB which transmitted the random access preamble for a predefined period of time, until an event occurs, or indefinitely.

In some embodiments, the modification may include the user equipment applying one or more backoff scaling factors to the at least one received BI. Each backoff scaling factor may be associated with a numeric value. In some embodiments, the one or more backoff scaling factors may be related to the applicability of the BI. For example, one or more backoff scaling factors may be utilized for a BI applied irrespective of the beams which transmitted the at least one random access preamble in step 401. Furthermore, one or more backoff scaling factors may be utilized for a BI applied to all or some beams of the user equipment. Finally, one or more backoff scaling factors may be utilized for a BI associated with a group of one or more beams and/or SSBs of the user equipment. Where the BI indicates that the BI applies regardless of the beams used by the user equipment, the BI may still be applicable even if the user equipment selects another beam for further attempts; thus, the user equipment may not reuse any beam before the backoff had expired. As a result, subsequent random access preamble transmissions may be delayed during the backoff timer. Alternatively, where the BI indicates that the BI applies only at least one specific beam or to at least group of at one or more beams, the BI may only be applied to at least one current beam, and the user equipment may immediately attempt to reuse another beam if available. As a result, the SSB corresponding with the transmitted random access preamble, as well as for each SSB associated with the same physical random access channel (PRACH) occurrence, may be delayed during the backoff timer.

Some embodiments may provide additional functionality when at least one BI is received from the network entity in step 403. For example, where the BI applies to all or some beams of the user equipment and/or a group of one or more beams and/or SSBs of the user equipment, if RACH preambles are mapped to at least one channel state information reference signal (CSI-RS) which do not correspond with at least one SSB beam, the user equipment may receive at least one RAR using at least one downlink beam in at least one direction simultaneously. In certain embodiments, the user equipment may receive an indication of a subset of downlink beams of the user equipment as a part of the RAR with at least one BI, and the user equipment network entity may determine whether at least one received BI is beam or cell specific, according to the signaled indication.

FIG. 5 illustrates an example of a system according to certain embodiments. In one embodiment, a system may include multiple devices, such as, for example, user equipment 510 and/or network entity 520.

User equipment 510 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

Network entity 520 may be one or more of a base station, such as an evolved node B (eNB) or 5G or New Radio node B (gNB), a serving gateway, a server, and/or any other access node or combination thereof. Furthermore, network entity 510 and/or user equipment 520 may be one or more of a citizens broadband radio service device (CBSD).

One or more of these devices may include at least one processor, respectively indicated as 511 and 521. Processors 511 and 521 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of devices indicated at 512 and 522. The memory may be fixed or removable. The memory may include computer program instructions or computer code contained therein. Memories 512 and 522 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

Processors 511 and 521 and memories 512 and 522 or a subset thereof, may be configured to provide means corresponding to the various blocks of FIGS. 1-4. Although not shown, the devices may also include positioning hardware, such as GPS or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 5, transceivers 513 and 523 may be provided, and one or more devices may also include at least one antenna, respectively illustrated as 514 and 524. The device may have many antennas, such as an array of antennas configured for multiple input multiple output (MIMO) communications, or multiple antennas for multiple radio access technologies. Other configurations of these devices, for example, may be provided. Transceivers 513 and 523 may be a transmitter, a receiver, or both a transmitter and a receiver, or a unit or device that may be configured both for transmission and reception.

The memory and the computer program instructions may be configured, with the processor for the particular device, to cause a hardware apparatus such as user equipment to perform any of the processes described below (see, for example, FIGS. 1-4). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-4. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Partial Glossary

3 GPP 3rd Generation Partnership Project
5G 5th Generation Wireless System
BC Backoff Configuration
BI Backoff Indicator
CSI-RS Channel State Information Reference Signal
eNB evolved Node B
E-UTRAN Evolved Universal Mobile Telecommunications System Terrestrial Radio Access Network
gNB Next Generation Node B
LTE Long Term Evolution
MAC Medium Access Control
NE Network Entity
NR New Radio
PCI Physical Cell Identity
PDU Protocol Data Unit
PLMN Public Land Mobile Network
PRACH Physical Random Access Channel
RA Radio Access RACH Radio Access Channel
RAN Radio Access Network
RANAC Radio Access Network Area Code
RAPID Random Access Preamble Identifier
RAR Random Access Response
RO Random Access Channel Occasion
RRC Radio Resource Control
SIB System Information Block
SSB Synchronization Signal Block
UE User Equipment

What is claimed is:

1. An apparatus, comprising:
at least one processor; and
at least one non-transitory memory including computer program code,
wherein the at least one memory and the computer program code are configured to, with the at least one processor, cause the apparatus to:
receive at least one random access preamble from a user equipment;
configure at least one backoff indicator;
transmit the at least one backoff indicator to the user equipment in response to the at least one random access preamble; and
transmit at least one backoff configuration indicator to the user equipment in response to the at least one random access preamble,
wherein the at least one backoff configuration indicator is configured to indicate whether the at least one backoff indicator applies to:
a specific beam, or
a group of beams.

2. The apparatus according to claim 1, wherein the at least one backoff configuration indicator is configured to indicate whether the at least one backoff indicator applies to
the specific beam regardless of at least one beam used for the at least one random access preamble; or
the group of beams regardless of the at least one beam used for the at least one random access preamble.

3. The apparatus according to claim 1, wherein the specific beam or the group of beams is/are associated to the random access preamble received from the user equipment.

4. The apparatus according to claim 1, wherein the at least one backoff configuration indicator is transmitted as part of at least one medium access control protocol data unit subheader for random access response or at least one system information block for system information broadcast, wherein the at least one backoff indicator is at least partially different from the at least one backoff configuration indicator, wherein the at least one backoff configuration indicator is configured to indicate a set of one or more beams to which the at least one backoff indicator is applicable.

5. The apparatus according to claim 1, wherein the at least one backoff configuration indicator is determined implicitly from a configuration of at least one group of beams.

6. The apparatus according to claim 5, wherein the configuration of the at least one group of beams is at least one of:
beams sharing a same random access occasion; or
an explicitly configured group of beams.

7. The apparatus according to claim 1, wherein the at least one backoff configuration indicator configures whether the at least one backoff indicator applies to at least one of:
at least one beam associated with at least one synchronization signal block; or
at least one beam associated with at least one channel state information reference signal.

8. An apparatus, comprising:
at least one processor; and
at least one non-transitory memory including computer program code,
wherein the at least one memory and the computer program code are configured to, with the at least one processor, cause the apparatus to:
transmit at least one random access preamble associated with at least one beam to a network entity;
receive at least one backoff indicator in response to the at least one random access preamble;
receive at least one backoff configuration indicator in response to the at least one random access preamble, wherein the at least one backoff configuration indicator is configured to indicate whether the at least one backoff indicator applies to:
a specific beam, or
a group of beams; and
determine applicability of the at least one backoff indicator based on the at least one backoff configuration indicator.

9. The apparatus according to claim 8, wherein the at least one backoff configuration indicator is configured to indicate whether the at least one backoff indicator applies to
the specific beam regardless of the at least one beam used for transmitting the at least one random access preamble; or
the group of beams regardless of the at least one beam used for transmitting the at least one random access preamble.

10. The apparatus according to claim 8, wherein the group of beams comprises one or more beams sharing a same random access channel occasion as the at least one beam used for transmitting the at least one random access preamble.

11. The apparatus according to claim 8, wherein the at least one memory and the computer program code are further configured to, with the at least one processor, cause the apparatus to:
determine that at least one of the at least one backoff indicator applies to one of:
a group of one or more beams and/or synchronization signal blocks; or
a specific beam/synchronization signal block.

12. The apparatus according to claim 8, wherein a backoff indicator of the at least one backoff indicator is associated with a backoff time value.

13. The apparatus according to claim 8, wherein the at least one memory and the computer program code are further configured to, with the at least one processor, cause the apparatus to:
apply one or more backoff scaling factors to the at least one received backoff indicator.

14. The apparatus according to claim 8, wherein the at least one backoff indicator is received as at least one of:
part of at least one medium access control protocol data unit subheader for random access response;
part of at least one system information block for system information broadcast for initial access; or
part of at least one dedicated radio resource control signaling for radio access associated with mobility events,
wherein the at least one backoff indicator is separate from the at least one backoff configuration indicator.

15. The apparatus according to claim 8, wherein the at least one backoff configuration indicator is configured to indicate whether the at least one backoff indicator applies to at least one of
- the at least one beam associated with at least one synchronization signal block; or
- the at least one beam associated with at least one channel state information reference signal.

16. The apparatus according to claim 8, wherein the at least one backoff configuration indicator is determined implicitly from a configuration of at least one group of beams.

17. A method, comprising:
- transmitting, with a user equipment, at least one random access preamble associated with at least one beam to a network entity;
- receiving, with the user equipment, at least one backoff indicator in response to the at least one random access preamble;
- receiving at least one backoff configuration indicator in response to the at least one random access preamble, wherein the at least one backoff configuration indicator is configured to indicate whether the at least one backoff indicator applies to:
  - a specific beam, or
  - a group of beams; and
- determining, with the user equipment, applicability of the at least one backoff indicator based on the at least one backoff configuration indicator.

18. The method according to claim 17, wherein the at least one backoff configuration indicator is configured to indicate whether the at least one backoff indicator applies to
- the specific beam regardless of the at least one beam used for transmitting the at least one random access preamble; or
- the group of beams regardless of the at least one beam used for transmitting the at least one random access preamble.

19. The method according to claim 17, wherein the group of beams comprises one or more beams sharing a same random access channel occasion as the at least one beam used for transmitting the at least one random access preamble.

20. The method according to claim 17, wherein the at least one backoff indicator is received as one of:
- part of at least one medium access control protocol data unit subheader for random access response;
- part of at least one system information broadcast for initial access; or
- part of at least one dedicated radio resource control signaling for radio access associated with mobility events.

* * * * *